Figure 1:
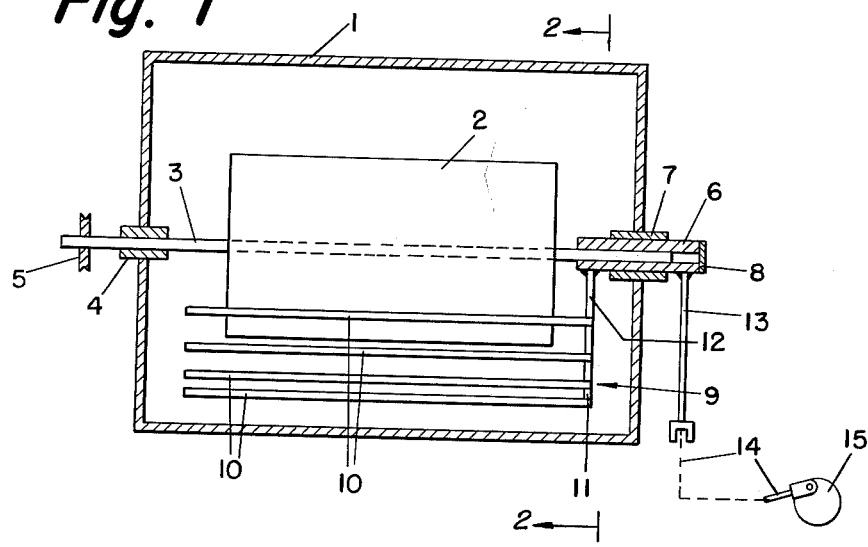

June 13, 1961  C. F. GREEN  2,988,224
ROTARY FILTER ASSEMBLY
Filed Dec. 18, 1958

INVENTOR.
CHARLES F. GREEN
BY
ATTORNEY

United States Patent Office 2,988,224
Patented June 13, 1961

2,988,224
ROTARY FILTER ASSEMBLY
Charles F. Green, Wilmington, Del., assignor to Sun Oil Company, Philadelphia, Pa., a corporation of New Jersey
Filed Dec. 18, 1958, Ser. No. 781,404
2 Claims. (Cl. 210—383)

This invention relates to a rotary filter assembly, and more particularly to such an assembly adapted to be enclosed in a pressure tight housing, for use at superatmospheric pressures.

For proper filtration of slurries, it is necessary that the slurry be agitated, to obtain a slurry of uniform consistency. Therefore, many rotary filters are supplied with an agitator, in addition to the filter drum itself. This agitator is normally driven in an oscillating or reciprocating fashion, while the filter drum is driven in rotary fashion.

For the filtration of many slurries, it is necessary to use pressures above atmospheric, that is, to carry out the filtering action within a pressure tight housing wherein there is maintained a super-atmospheric pressure of small value. This super-atmospheric pressure may be required in order to provide the desired solubility characteristics for the slurry. In addition, other applications of a rotary filter often require that the filter housing be pressure tight, to prevent loss of solvent and/or to protect the operator from combustible or otherwise dangerous solvents.

The design of conventional, commercially-available rotary filters is such that they cannot be readily enclosed in a pressure tight housing, while yet providing for proper mechanical movement of the agitator, inside such housing.

An object of this invention is to provide a novel rotary filter assembly.

Another object is to provide a rotary filter assembly, including an agitator, which can be enclosed in a pressure tight housing.

A further object is to provide a novel mechanical arrangement for transmitting rotary and oscillatory motions, respectively, to two different elements of a rotary filter, inside a pressure tight housing.

The objects of this invention are accomplished, briefly, in the following manner.

Inside a pressure tight housing are mounted a cylindrical drum constituting a filter element, and an agitator, the agitator being positioned externally of the drum and in the lower part of the housing. An elongated shaft is secured to the drum substantially along the longitudinal axis thereof, one end of this shaft extending through a bearing in the housing in such a way as to mount or journal the drum for rotation in the housing; a mechanical driving means positioned externally of the housing is coupled to this end of the shaft outside of the housing, to produce continuous rotation of this shaft and thereby also of the drum. The other end of the drum shaft is mounted for rotation in a sleeve which is in turn mounted or journalled for movement in a bearing in the housing, the said sleeve thus providing a bearing for the other end of the drum shaft. A rigid supporting and driving member suspends the agitator in position within the housing, one end of this member being attached to the agitator and the other end of such member being attached to the aforementioned sleeve. A mechanical driving means positioned externally of the housing is coupled to that end of the sleeve which extends outside of the housing, to produce oscillatory or reciprocating motion of the sleeve and thereby also of the agitator.

Figure 2:
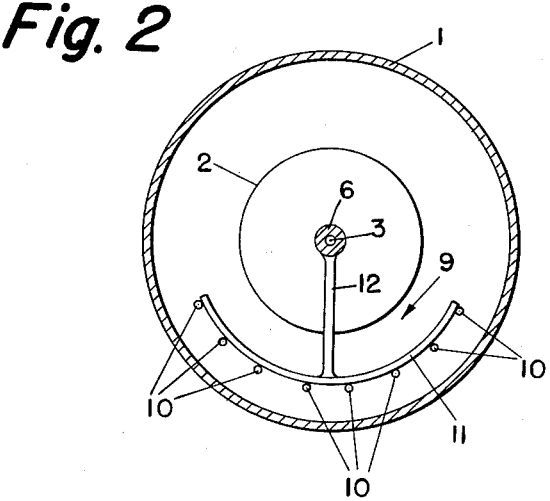

A detailed description of the invention follows, taken in conjunction with the accompanying drawing, wherein:

FIGURE 1 is a vertical longitudinal section through a rotary filter assembly according to this invention, certain parts being shown somewhat diagrammatically; and FIGURE 2 is a transverse sectional view of the filter assembly, taken on a plane near one end of the outer housing.

Referring now to the drawing, a pressure tight housing 1, which for convenience may be generally cylindrical in outer configuration with its longitudinal axis extending substantially horizontally, is arranged to house the principal or active parts of the rotary filter assembly. A substantially cylindrical filter drum 2 is positioned inside the housing 1, this drum being arranged for continuous rotation about its longitudinal axis (which extends substantially horizontally) and constituting the heart of the filter assembly. The cylindrical outer surface of drum 2 is covered with a suitable filter medium, such as canvas cloth, held in place by a wire winding, for example, in accordance with conventional filter drum construction.

In order to suitably mount and support filter drum 2 inside housing 1, drum 2 has fixed thereto an elongated shaft 3, which lies along the longitudinal axis of drum 2 and projects beyond the drum at both opposite ends thereof. Drum 2 is mounted for continuous rotation inside housing 1, to provide a rotary filter, by means of shaft 3. One end of shaft 3 is journalled for rotation in housing 1, as by means of a bearing 4 which is secured centrally in the left-hand disk-like end face or cover plate of housing 1. Suitable shaft seals (not shown) are provided around shaft 3, to permit rotation of this shaft and yet prevent pressure leakage or leakage of material therearound. In other words, the bearing 4 is made pressure tight. It may be desirable to provide a bearing at 4 which is enlarged or similar to a trunnion, to permit the passage therethrough of fixed pipes or conduits (not shown) which enable the filtrate to be removed from the interior of drum 2. A pulley or wheel 5 is keyed to that end of shaft 3 which extends outside of or externally of housing 1. Wheel 5 is driven from a drive motor, by means of a suitable gear or belt or chain drive arrangement coupling such wheel to the motor output shaft. In this way, wheel 5, and thereby also shaft 3 and filter drum 2, are rotated in continuous fashion.

The other end of shaft 3 is journalled for rotation within a sleeve bearing 6, which is in turn journalled or mounted for movement in housing 1 (and thus held in place) by means of a pressure tight bearing 7 which is secured centrally in the right-hand disk-like end face or cover plate of housing 1. The sleeve 6 and bearing 7 are fitted with oilers, for lubrication. A cover plate 8 may be provided at the outer end of sleeve 6, to cover the shaft hole therein and prevent pressure leakage or leakage of material therethrough. If desired, a suitable cover or seal may be provided at the inner end of sleeve 6, to prevent the leakage into sleeve 6 of any material which might damage the same.

By means of the construction described, including shaft 3, one end of which is journalled for rotation in bearing 4 and the opposite end of which is journalled for rotation in sleeve 6, the filter drum 2 is mounted for continuous rotation inside housing 1, and is so rotated through the agency of the means which is adapted to be mechanically coupled to wheel 5.

An agitator element, designated generally by the numeral 9, is positioned within housing 1, near the bottom end thereof, but externally of the drum 2. This element is adapted to oscillate or reciprocate back and forth, with a clearance of about two inches from the rotating drum 2 and about one inch from the bottom of the slurry reservoir or housing 1. The agitation of the slurry in housing 1 by agitator 9 (when the latter moves) enables a slurry of uniform consistency to be obtained, thus assisting in proper filtration.

In accordance with the usual (and conventional)

operation of rotating-drum filters, the slurry (i.e., the material to be processed) is supplied (e.g., by means of a pipe connection, not shown) to the interior of housing 1, exteriorly of drum 2. The filtrate (liquid portion of the slurry) passes through the covering on drum 2 into the interior of the hollow drum (from whence it is removed, as previously stated), while the solid portion of the slurry collects as a cake on the outer surface of drum 2, from whence it may be removed by a knife, if desired.

The agitator element 9 is constructed of a plurality of spaced steel rods 10 which extend parallel to each other and longitudinally of the housing 1, these rods being arranged in the form of an arc. These steel rods may be ¼ to ⅜ inch in diameter, and are secured at their right-hand ends to spaced points on the bottom surface of an arcuate metal member 11. Member 11, in addition to its function of securing the rods 10 together to form a single agitator element, enables the agitator element to be moved back and forth in an oscillatory or reciprocating manner, as will be further described hereinafter.

Instead of using rods for the agitator 9, pieces of angle iron may be used, perhaps ½ inch wide by ⅛ inch thick. In addition to the agitator elements 10 being held in assembled position by the arcuate member 11, the agitator 9 is held in a rigid position within the housing 1 by means of a steel arm 12, which is firmly attached to the movable sleeve 6 at its upper end and is firmly attached to the arcuate member 11 at its lower end. Outside of the housing 1, the sleeve 6 (which, as previously stated, serves as a bearing for the rotating filter drum 1) is attached to a steel arm 13, which can be moved in an oscillatory or reciprocating motion to another arm or crank 14 attached at one end to arm 13 and at its opposite end to an eccentric bearing on a drive wheel 15. Drive wheel 15 is adapted to be rotated, as through a suitable gear or belt or chain drive, by means of a drive motor. It will be appreciated that the showing of driving members 14 and 15 is diagrammatic and is only for the purpose of ease in illustration; actually, of course, the arm 14 and the eccentric bearing on wheel 15 would necessarily be in the same vertical plane (in FIGURE 1) as arm 13. As drive wheel 15 is rotated, arms 14 and 13 cause sleeve 6 to move in a forward and backward motion, or in other words, in an oscillatory or reciprocating manner. Because of the bearing 7 in which sleeve 6 is mounted, this sleeve is free to move with respect to the housing 1. At the same time, as previously described, sleeve 6 serves as a journal bearing for the right-hand end of the drum shaft 3. As sleeve 6 oscillates back and forth, the arm 12 secured to the inner end of this sleeve also oscillates back and forth. Thus, the agitator 9 is caused to move back and forth in an oscillatory manner, and this oscillatory motion of the agitator occurs while the filter drum 2 is being rotated in a continuous manner. It will be observed that the elements 13, 14, 15, etc. together comprise means positioned externally of the housing 1 and adapted to be mechanically coupled to the agitator element 9, to produce oscillatory motion thereof.

As a typical example, the angle through which the agitator 9 oscillates is about 90°, or 45° to the right and left of the vertical position illustrated in FIGURE 2. This angle may be increased or decreased simply by adjusting the position of arm 14 on eccentric wheel 15. The speed of travel of the agitator (expressed in the number of agitation cycles per minute) is adjusted by adjusting the speed of the (oscillatory) drive.

It may be preferable to utilize two separate drive motors for the filter assembly of this invention, one for rotating the filter drum 2 in a continuous manner and the other for effecting oscillatory motion of the agitator element 9.

It will be seen that according to this invention there has been provided a simple and convenient rotary filter construction, wherein the filter drum and the agitator are both positioned inside a pressure tight housing, yet wherein the filter drum is capable of being rotated in a continuous manner from a point outside the housing, and the agitator is capable of being moved in a reciprocating or oscillating manner, also from a point outside the housing.

As is common practice with rotary drum filters, an arrangement comprising a fixed scraper blade (whose width equals the length of drum 2, and which is positioned adjacent this drum, inside housing 1) may be provided for removing the material (cake) which clings to the outside of drum 2, as the latter revolves during the filtering operation.

The invention claimed is:

1. A rotary filter assembly comprising a pressure tight housing, a filter drum positioned inside and completely surrounded by said housing, an elongated shaft secured to said drum and projecting beyond the same at both opposite ends thereof, means journalling one end of said shaft for rotation in said housing, a sleeve journalled for movement in said housing, the other end of said shaft being journalled for rotation in said sleeve; an agitator element positioned inside said housing, and a rigid supporting and driving member secured at one end thereof to said agitator element and at its opposite end to said sleeve.

2. An assembly as defined in claim 1, including also means positioned externally of said housing and adapted to be mechanically coupled to said sleeve, to produce oscillatory motion of such sleeve and thereby also of said agitator element.

References Cited in the file of this patent
UNITED STATES PATENTS

| | | |
|---|---|---|
| 1,858,900 | Moore | May 17, 1932 |
| 2,393,150 | Dayton | Jan. 15, 1946 |
| 2,538,110 | Little | Jan. 16, 1951 |